US011980141B2

(12) United States Patent
Dudik et al.

(10) Patent No.: US 11,980,141 B2
(45) Date of Patent: May 14, 2024

(54) IRRIGATION SYSTEM WITH PRATT TRUSS SPANS

(71) Applicant: Lindsay Corporation, Omaha, NE (US)

(72) Inventors: Matthew John Dudik, Elkhorn, NE (US); Michael South, Council Bluffs, IA (US); Troy Hanson, Blair, NE (US)

(73) Assignee: Lindsay Corporation, Omaha, NE (US)

( * ) Notice: Subject to any disclaimer, the term of this patent is extended or adjusted under 35 U.S.C. 154(b) by 132 days.

(21) Appl. No.: 17/861,040

(22) Filed: Jul. 8, 2022

(65) Prior Publication Data

US 2024/0008430 A1     Jan. 11, 2024

(51) Int. Cl.
*A01G 25/09* (2006.01)

(52) U.S. Cl.
CPC .................... *A01G 25/092* (2013.01)

(58) Field of Classification Search
CPC ..... A01G 25/092; A01G 25/09; F16L 27/023; F16L 27/00; F16L 27/02
USPC ..... 285/118, 184, 185, 145.2, 283; 239/726, 239/732
See application file for complete search history.

(56) References Cited

U.S. PATENT DOCUMENTS

| | | | |
|---|---|---|---|
| 3,951,165 A | 4/1976 | Seger et al. | |
| 3,997,192 A * | 12/1976 | Hansen | A01G 25/092 285/226 |
| 4,090,528 A | 5/1978 | Hegemann | |
| 4,290,556 A * | 9/1981 | McConnell | A01G 25/092 239/731 |
| 6,109,535 A | 8/2000 | Korus | |
| 7,384,008 B1 * | 6/2008 | Malsam | G01B 11/27 239/731 |
| 9,066,475 B1 * | 6/2015 | Toman | A01G 25/095 |
| 2002/0107582 A1 | 8/2002 | Pollak et al. | |
| 2005/0023065 A1 | 10/2005 | Peterson | |
| 2007/0176030 A1 | 8/2007 | Korus | |

(Continued)

FOREIGN PATENT DOCUMENTS

CN          105766556 A        7/2016

OTHER PUBLICATIONS

International Search Report and Written Opinion in related PCT Application PCT/US2023/069672 dated Oct. 24, 2023, 8 pages.

(Continued)

*Primary Examiner* — Kristen C Hayes
(74) *Attorney, Agent, or Firm* — Hovey Williams LLP

(57) ABSTRACT

An irrigation system includes support towers, pipeline spans, a joint pivotally connecting the pipeline spans, and a truss section. One pipeline span extends between the support towers along a central axis and includes a middle region, and the other is adjacent and coaxial with the first pipeline span when aligned. The truss section supports one of the pipeline spans and includes compression elements, truss structures, and tension elements. The compression elements extend downward from the pipeline span. The truss structures extend longitudinally along the pipeline span and are fixed relative to the compression elements. The tension elements extend diagonally downward from the pipeline span toward the middle region of the pipeline span and are fixed relative to the truss structures.

20 Claims, 16 Drawing Sheets

(56) References Cited

U.S. PATENT DOCUMENTS

2020/0014622 A1    5/2020    Dudik et al.

OTHER PUBLICATIONS

Williams, Alan. "Pratt Truss." Chapter from Structural and Stress Analysis (Fourth Edition), 2009, 18 pages. <https://www.sciencedirect.com/topics/engineering/pratt-truss>.
Tempro RIEGO, "Tempro RIEGO," Facebook, Oct. 19, 2015, 13 pages. <https://www.facebook.com/TemproRiego>.

* cited by examiner

IRRIGATION SYSTEM WITH PRATT TRUSS SPANS

BACKGROUND

As an irrigation system moves across a field, small mounds and other variations on the ground cause pipe sections to apply torsional forces to one another causing stress on the pipe section joints and other components. Additionally, towers of the irrigation systems often get out of alignment due to the variations in their motor speeds causing further stress. Over time, the stress can result in damage to the irrigation system.

The background discussion is intended to provide information related to the present invention which is not necessarily prior art.

SUMMARY OF THE INVENTION

The present invention solves the above-described problems and other problems by providing an irrigation system that enable three-degrees of freedom between pipe sections and that reinforces the pipe sections, which reduces stress and damage to the irrigation system.

An irrigation system constructed according to an embodiment of the invention includes two support towers, a first pipeline span, a second pipeline span, a joint, and a truss section. The first pipeline span extends between the two support towers along a central axis and includes a middle region. The second pipeline span is adjacent to the first pipeline span and is coaxial with the first pipeline span when the first pipeline span and the second pipeline span are aligned. The joint pivotally connects the first pipeline span to the second pipeline span and includes a sleeve, a first portion, and a second portion. The sleeve is configured to provide a sealed fluid connection between the first pipeline span and the second pipeline span. The first portion is secured to the first pipeline span and has an upwardly facing hemispherical surface. The second portion is secured to the second pipeline span and has a cavity that receives at least a portion of the hemispherical surface of the first portion to form a contact line coincident with the central axis when the first pipeline span and the second pipeline span are aligned.

The truss section supports the first pipeline span and includes compression elements, truss structures, and tension elements. The compression elements extend downward from the first pipeline span. The truss structures extend longitudinally along the first pipeline span and are fixed relative to the compression elements. The tension elements extend diagonally downward from the first pipeline span toward the middle region of the first pipeline span and are fixed relative to the truss structures.

An irrigation system constructed according to another embodiment of the invention includes a plurality of mobile support towers, a plurality of pipeline spans, a plurality of joints, and a plurality of truss sections. The mobile support towers are configured to move across a field. The pipeline spans are supported above the field by the support towers and extend along a central axis when aligned, and each pipeline span includes a middle region. The joints pivotally connect the pipeline spans, and each joint includes a sleeve, a first portion, and a second portion. The sleeve is configured to provide a sealed fluid connection between two pipeline spans. The first portion is secured to one of the two pipeline spans and has an upwardly facing hemispherical surface. The second portion is secured to the other of the two pipeline spans and has a cavity that receives at least a portion of the hemispherical surface of the first portion to form a contact line coincident with the central axis when the two pipeline spans are aligned.

The truss sections support the pipeline spans, and each truss section includes compression elements, truss structures, and tension elements. The compressions elements extend downward from their respective pipeline spans. The truss structures extend longitudinally along their respective pipeline spans and are fixed relative to their respective compression elements. The tension elements extend diagonally downward from their respective pipeline spans toward the middle region of their respective pipeline spans and are fixed relative to the truss structures.

An irrigation system constructed according to another embodiment of the invention includes two support towers, a first pipeline span, a second pipeline span, a joint, and a truss section. The first pipeline span extends between the two support towers along a central axis. The second pipeline span is adjacent to the first pipeline span and is coaxial with the first pipeline span when the first pipeline span and the second pipeline span are aligned. The joint pivotally connects the first pipeline span to the second pipeline span and includes a sleeve, a first portion, and a second portion. The sleeve is configured to provide a sealed fluid connection between the first pipeline span and the second pipeline span. The first portion is secured to the first pipeline span and has an upwardly facing hemispherical surface. The second portion is secured to the second pipeline span and has a cavity that receives at least a portion of the hemispherical surface of the first portion to form a contact line coincident with the central axis when the first pipeline span and the second pipeline span are aligned.

The truss section supports the first pipeline span and includes pairs of tubular brace structures, truss straps, tubular cross ties, and pipe straps. The tubular brace structures are axially spaced along the first pipeline span and extend downward from the first pipeline span. The truss straps extend longitudinally along the first pipeline span between the tubular brace structures. The tubular cross tie structures extend laterally relative to the first pipeline span between the pairs of tubular brace structures. The pipe straps extend from the first pipeline span diagonally downward to the tubular brace structures in a direction toward a mid-point between the two support towers.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
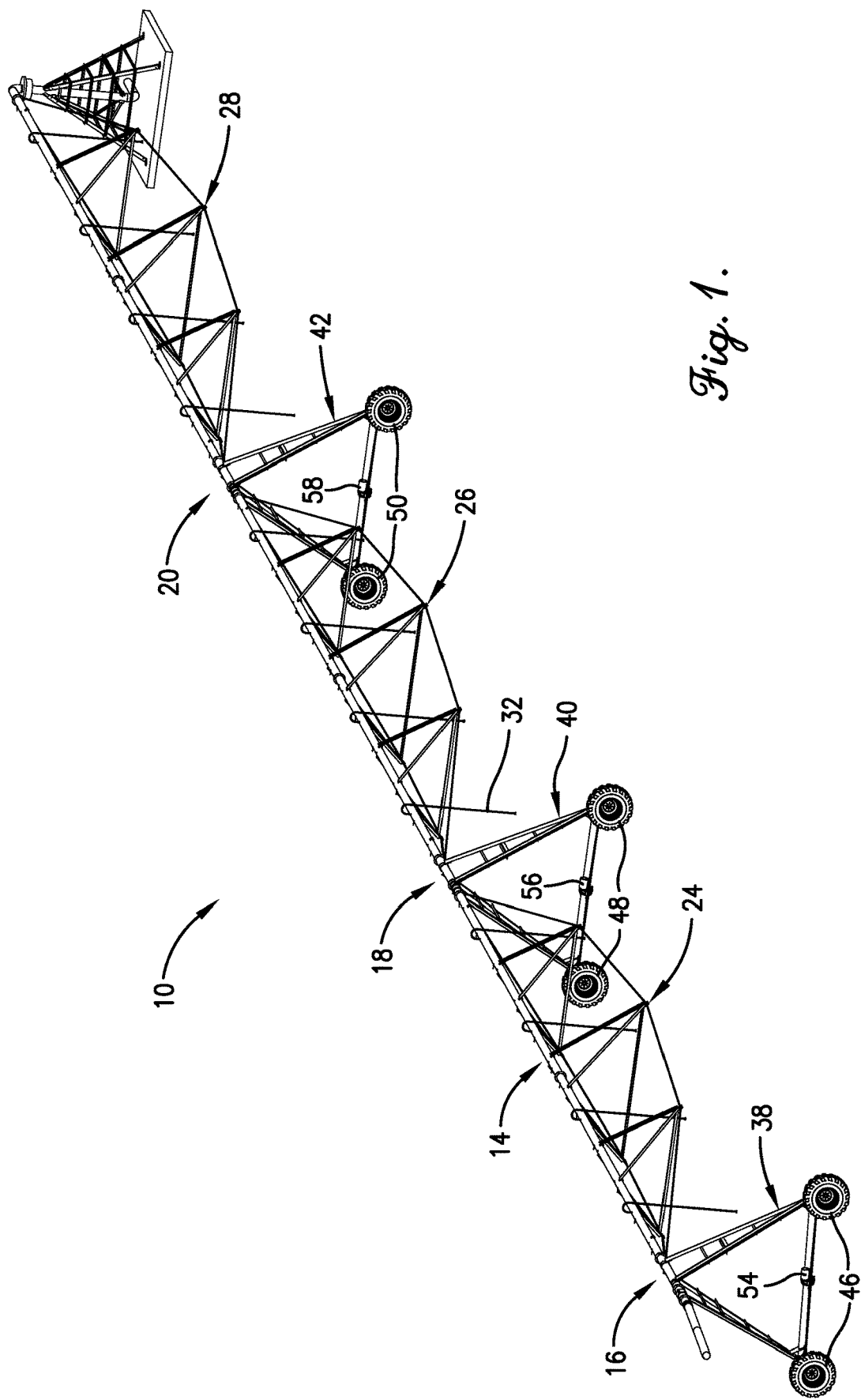
FIG. 1 is a perspective view of an irrigation system constructed in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, an irrigation system 10 constructed in accordance with an embodiment of the invention is illustrated. The illustrated irrigation system 10 is a pivot irrigation system, but can be any other irrigation system, such as a lateral move irrigation system. The irrigation system 10 may have access to a hydrant, well, water tank, or other source of water and may also be in fluid communication with a tank or other source of agricultural products to inject fertilizers, pesticides and/or other chemicals into the water for application during irrigation.

The irrigation system 10 may comprise a number of spaced-apart mobile towers 16, 18, 20, a fluid-distribution conduit 14 in fluid communication with the water source and supported by the towers 16, 18, 20 above a field, a plurality of truss sections 24, 26, 28 or other supports to form a number of interconnected spans that help support the conduit 14, and a plurality of fluid emitters 32 that are in fluid communication with the conduit 14.

The mobile towers 16, 18, 20 support the conduit 14 and carry the conduit 14 and emitters 32 across the field. Each mobile tower 16, 18, 20, includes a frame 38, 40, 42 for supporting a portion of the conduit 14 and wheels 46, 48, 50 rotatably attached to the frame 38, 40, 42. One or more of the towers 16, 18, 20 may include a motor 54, 56, 58 for driving the wheels 46, 48, 50 of its respective tower 16, 18, 20.

Figure 2:
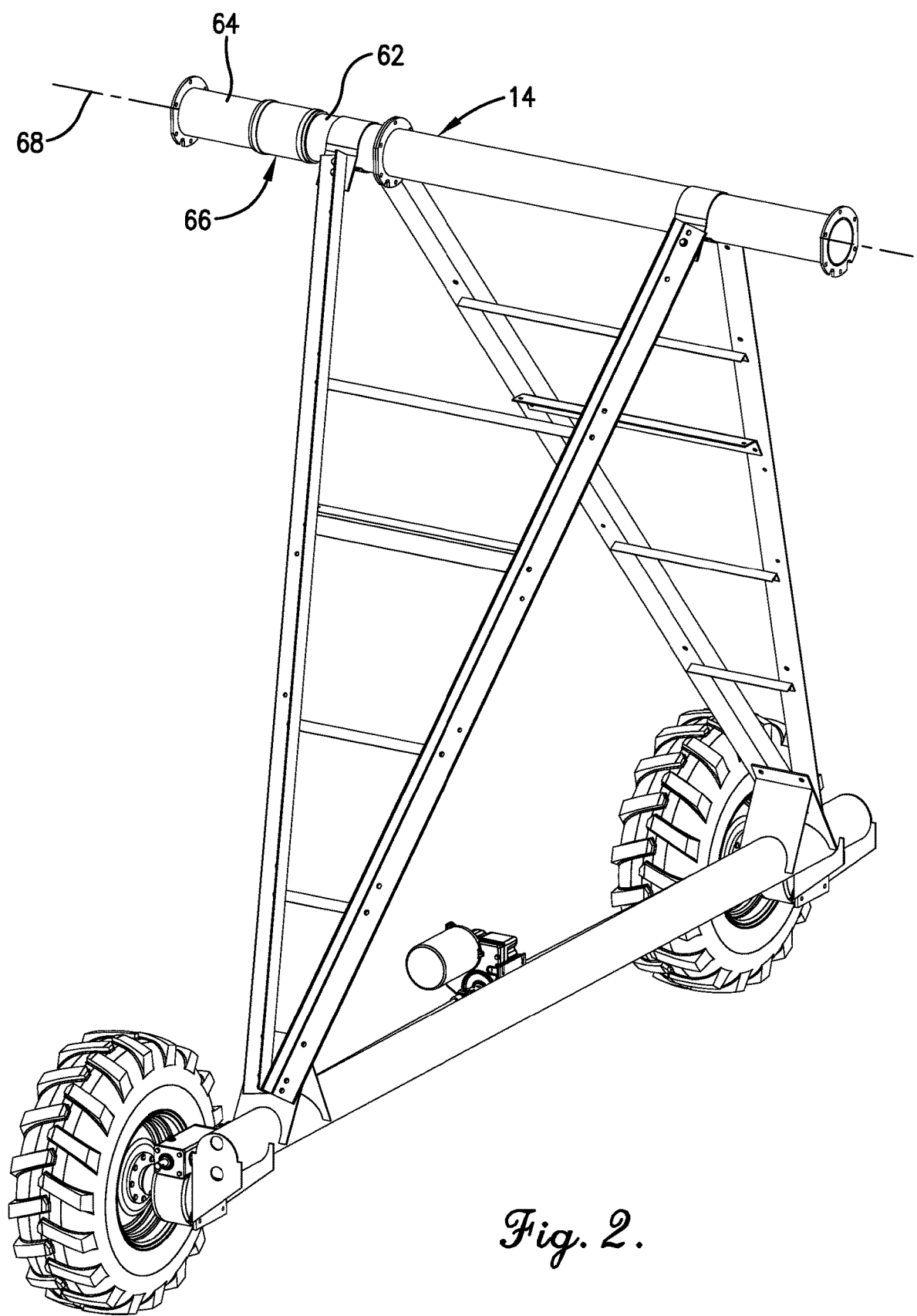
FIG. 2 is an exemplary tower of the irrigation system of FIG. 1 with a joint constructed in accordance with embodiments of the present invention.
Figure 3:
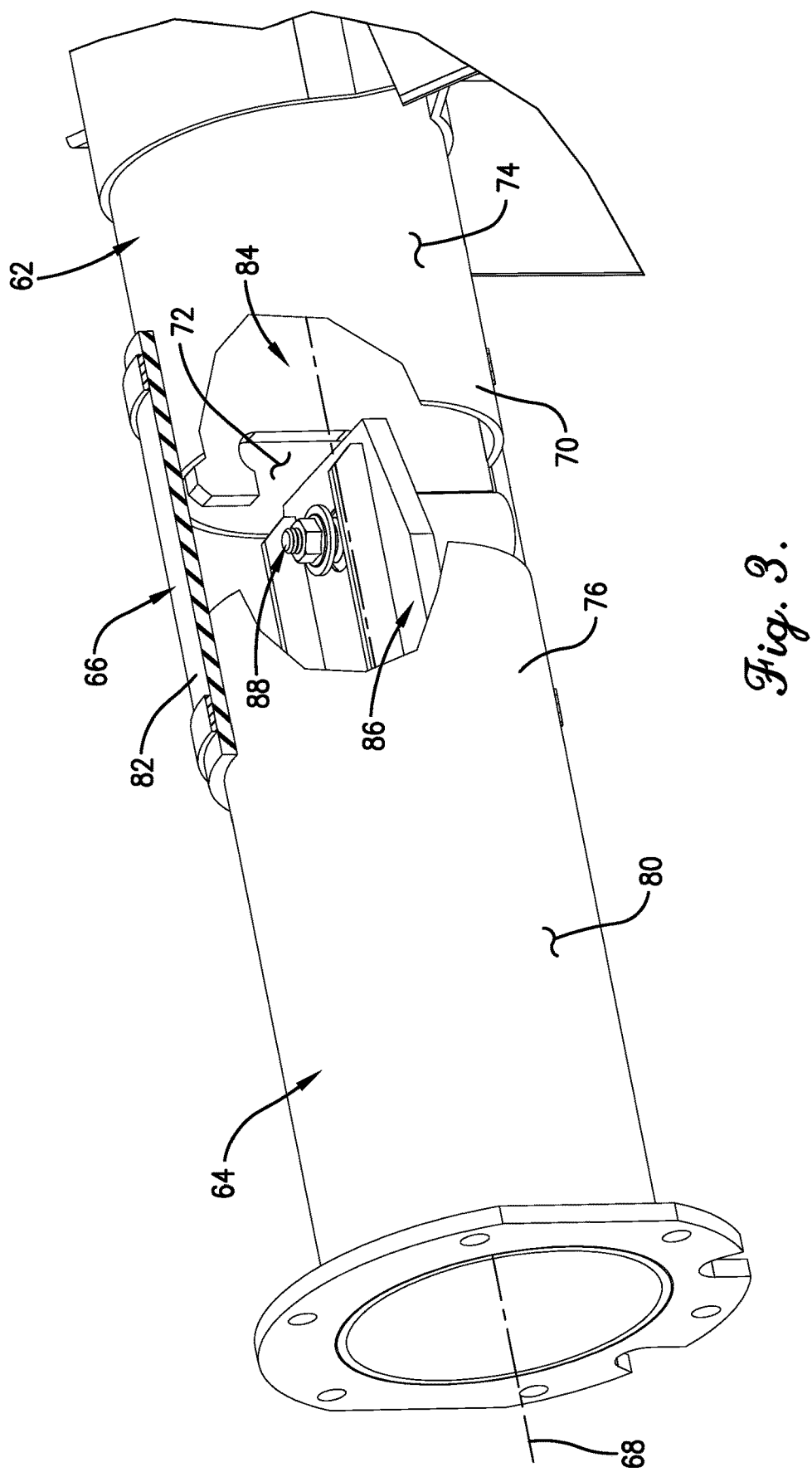
FIG. 3 is a partial view of the tower of FIG. 2 with portions hidden to reveal interior features of the joint.

The conduit 14 spans across the irrigation system 10 and carries water and/or other fluids to the emitters 32. Water and/or other fluids may travel from the water source to the conduit 14, which directs them to the emitters 32. Turning to FIG. 2, the conduit 14 may comprise a plurality of pipe sections 62, 64 connected via one or more joints 66. The first pipe section 62 is adjacent to the second pipe section 64, and the pipe sections 62, 64 are coaxial along a central axis 68 when aligned. Turning to FIG. 3, the first pipe section 62 may have a first end 70 extending along the central axis 68, an inner surface 72, and an outer surface 74. The second pipe section 64 has a second end 76 that is adjacent to the first end 70 of the first pipe section 62, an inner surface 78 (depicted in FIG. 4), and an outer surface 80.

The joint 66 comprises a sleeve 82, a first portion 84, a second portion 86, and fastening element 88. The sleeve 82 is configured to provide a sealed fluid connection between the first pipe section 62 and the second pipe section 64. For example, the sleeve 82 may engage the outer surface 74 of the first pipe section 62 and the outer surface 80 of the second pipe section 64. However, the sleeve 82 may provide a fluid connection between the pipe sections 62, 64 any number of ways without departing from the scope of the present invention.

Figure 4:
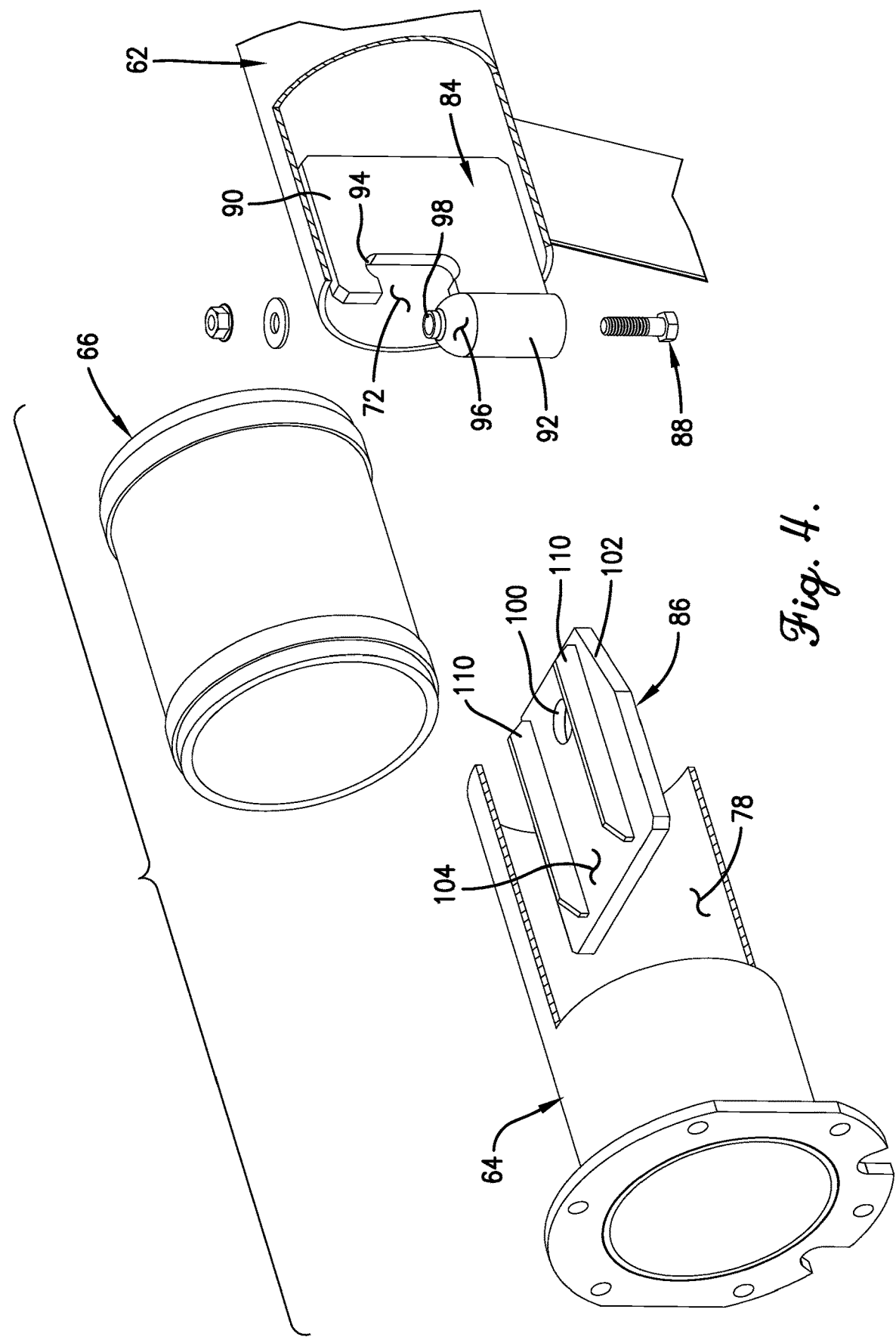
FIG. 4 is an elevated exploded view of the joint of FIG. 2.

Turning to FIG. 4, the first portion 84 is secured the first pipe section 62 and comprises a plate 90 and a vertically extending pin 92. The first portion 84 may be secured to the first pipe section 62 via welding. For example, the plate 90 may be welded to the inner surface 72 of the first pipe section 62. The plate 90 may extend vertically and include a slot 94 that allows a portion of the second portion 86 to pass through, as discussed in more detail below. The pin 92 is attached to the plate 90 and includes an upwardly facing top hemispherical surface 96 that intersects the central axis 68 of the first pipe section 62. The pin 92 may define a hole 98 extending through its length and through the hemispherical surface 96.

Figure 5:
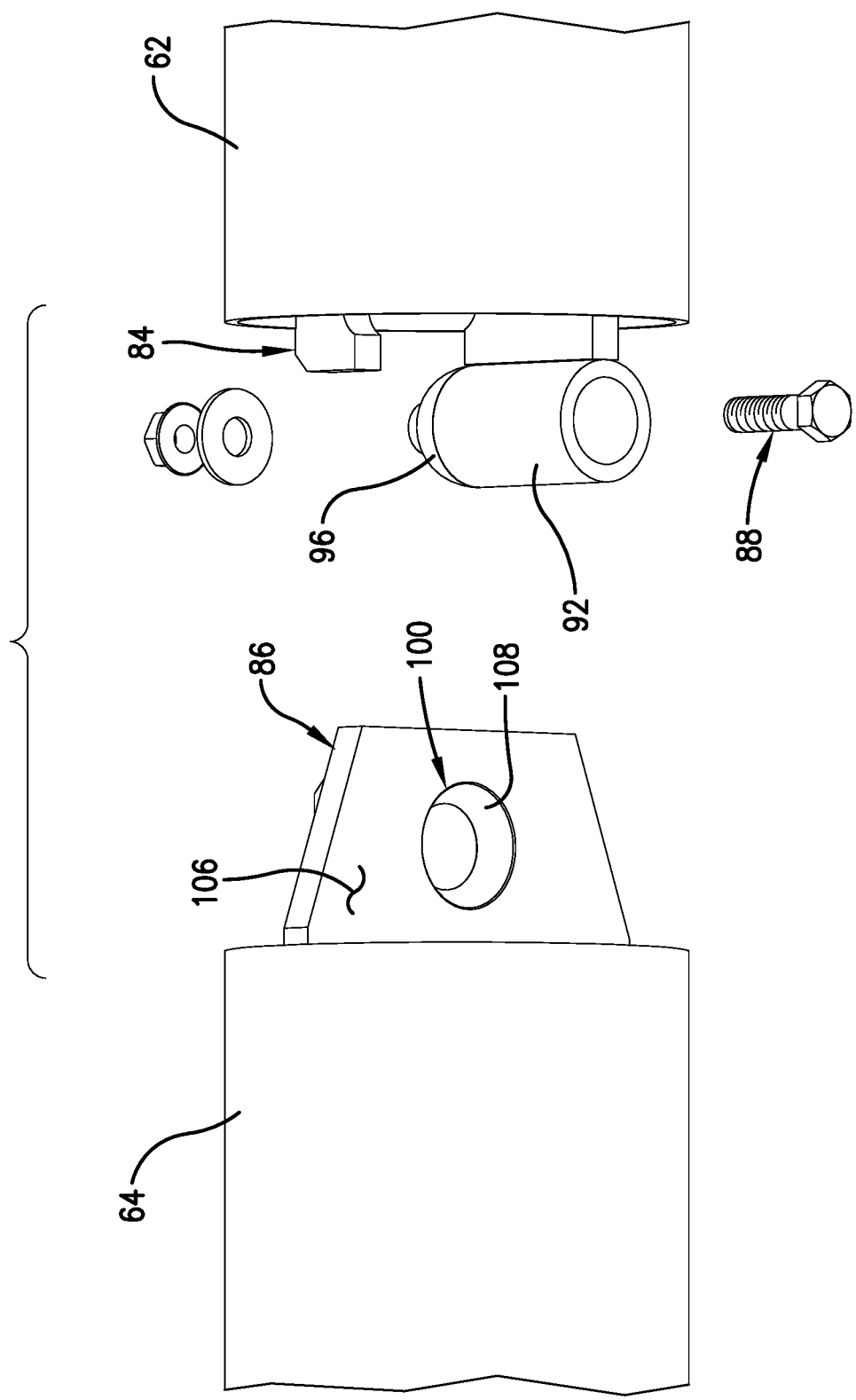
FIG. 5 is a lowered exploded view of the joint of FIG. 2.

The second portion 86 is secured to the second pipe section 64 and comprises a cavity 100 that receives at least a portion of the hemispherical surface 96 to form a contact line coincident with the central axis 68 when the pipe sections 62, 64 are aligned. The second portion 86 may comprise a horizontal plate 102 with a top surface 104 and a bottom surface 106 (depicted in FIG. 5) with the cavity 100 extending from the top surface 104 to the bottom surface 106. The plate 102 may be secured to the inner surface 78 of the second pipe section 64. The plate 102 may include stiffeners 110 for increasing the strength of the plate 102. As shown in FIG. 5, the cavity 100 may comprise a frustoconical countersink 108 on the bottom surface 106 of the plate 102.

Figure 6:
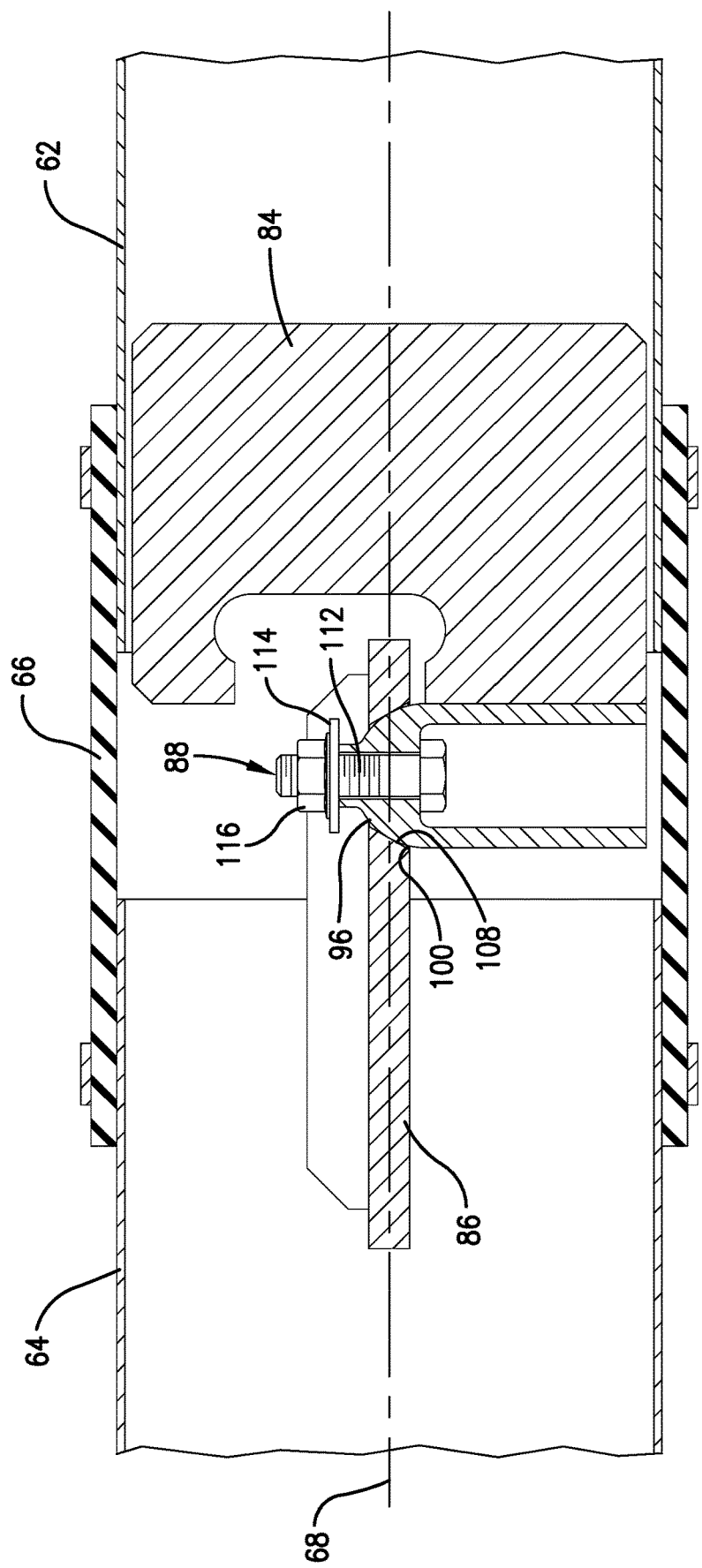
FIG. 6 is a partial cross-sectional view of the tower and the joint of FIG. 2.

The fastening element 88 is configured to secure the first portion 84 and the second portion 86 together. Turning to FIG. 6, the fastening element 88 may comprise a threaded portion 112 extending vertically from the hemispherical surface 96 of the first portion 84 through the cavity 100 of the second portion 86 and a capture ring 114 and nut 116 configured to engage the threaded portion 112. The fastening element 88 may be a fastener, such as a bolt, that extends through the hole 98 defined by the pin 92 of the first portion 84 and the cavity 100 formed in the horizontal plate 102 of the second portion 86.

Figure 7:
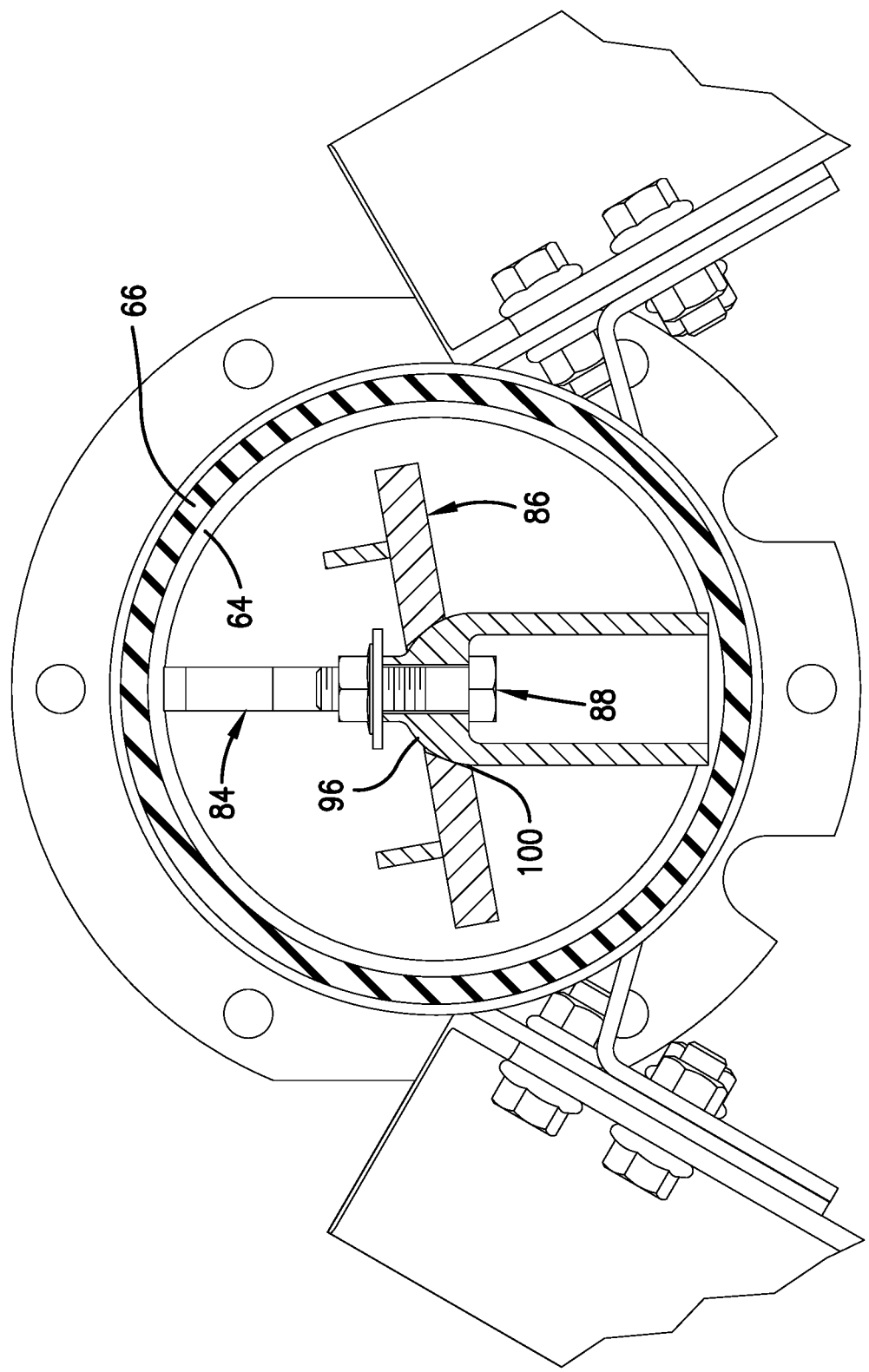
FIG. 7 is a partial view of the tower and the joint of FIG. 2 with pipe sections at an angle along a first plane.
Figure 8:
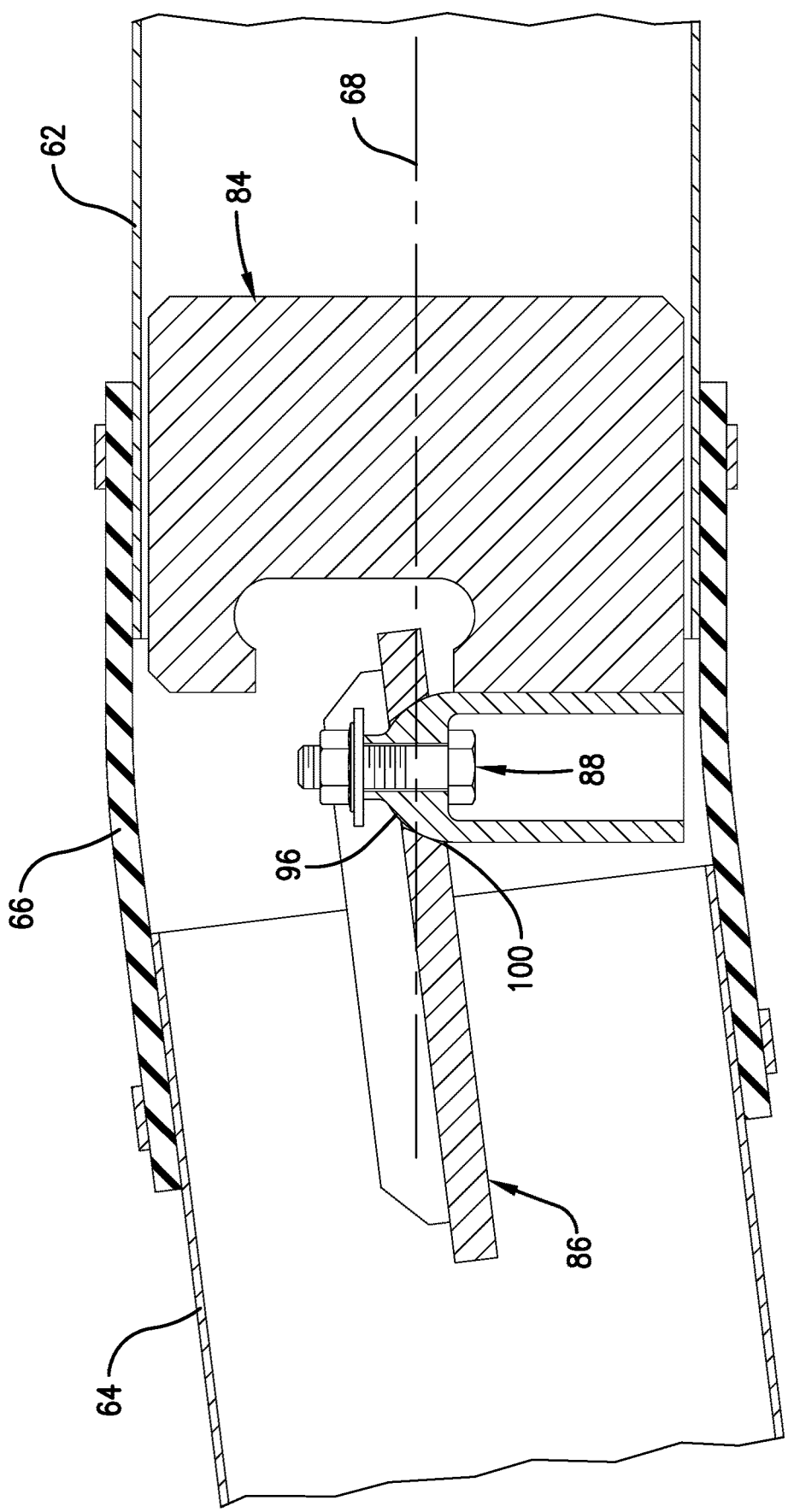
FIG. 8 is a partial cross-sectional view of the tower and the joint of FIG. 2 with pipe sections at an angle along a second plane.
Figure 9:
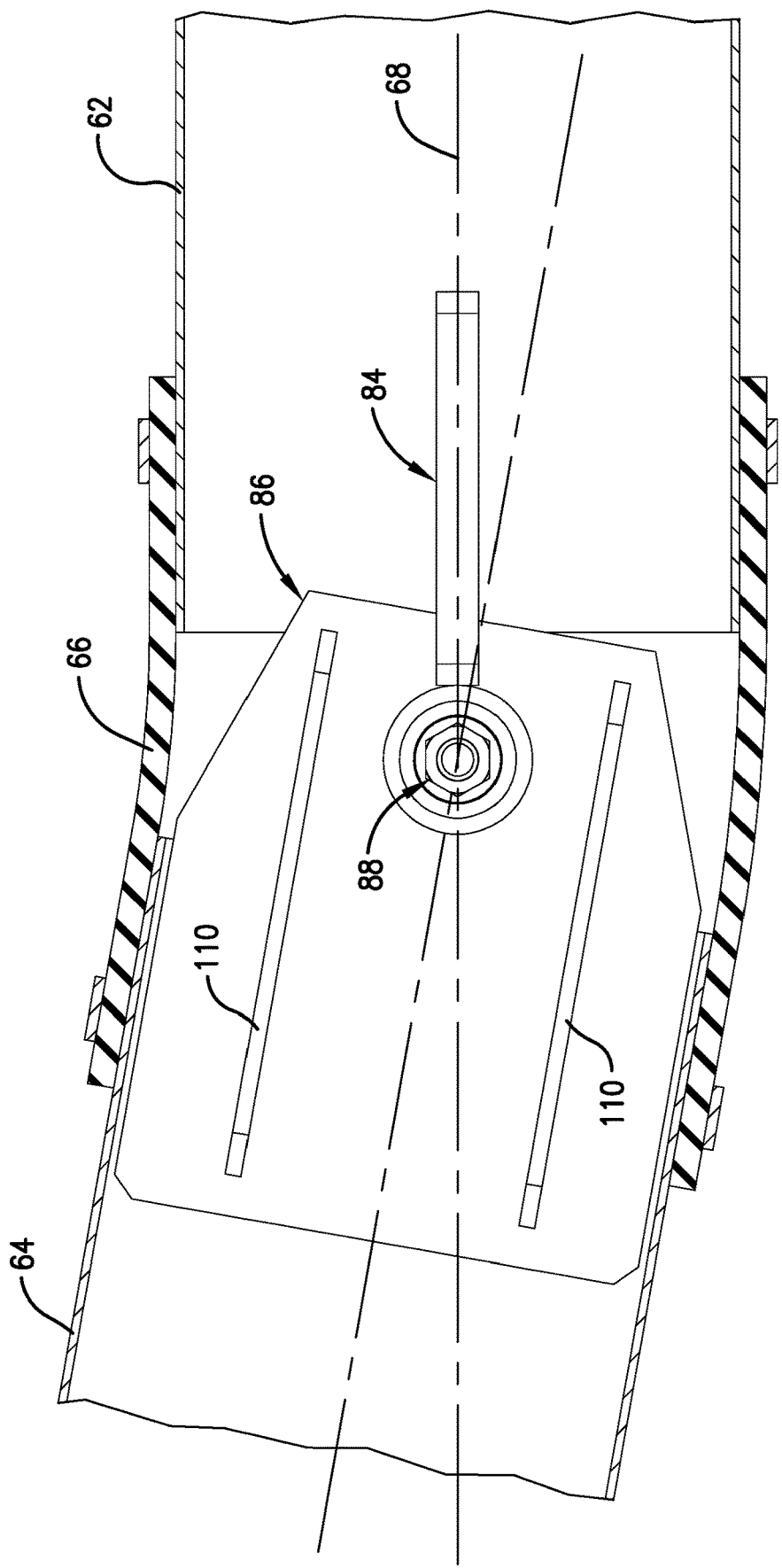
FIG. 9 is a partial cross-sectional view of the tower and the joint of FIG. 2 with pipe sections at an angle along a third plane.

By forming a line of contact coincident with the central axis 68 of the pipe sections 62, 64 via the hemispherical surface 96 and the cavity 100, the two pipe sections 62, 64 have three degrees of freedom to move relative to one another. This enables up to 30% of torsion in either direction. For example, the joint 66 enables two or more towers supporting the pipe sections 62, 64 to experience up to a 30% difference in transverse slopes or be otherwise axially rotated up to 17 degrees apart from each other, as depicted FIG. 7. Further, the joint 66 enables the pipe sections 62, 64 to withstand up to 30% differences in lateral slopes. For example, the joint 66 enables one of the pipe sections 64 to be at a different elevation than the other pipe section 62. Particularly, the joint 66 may enable the pipe sections 62, 64 to be on slopes having up to a 30% difference in either direction, or otherwise allow one of the pipe sections 62, 64 to be at an angle of up to 17 degrees from the central axis 68 in either direction, as depicted in FIG. 8. Additionally, the joint 66 enables tower misalignment up to five feet in either direction. In other words, one of the towers 16, 18, 20 supporting one of the pipe sections 62, 64 may be ahead of or behind the adjacent tower supporting the other one of the pipe sections 62, 64 by five feet or off by up to 2.5 degrees, as depicted in FIG. 9. Thus, the joint 66 enables a more robust and long-lasting irrigation system 10.

Figure 10:
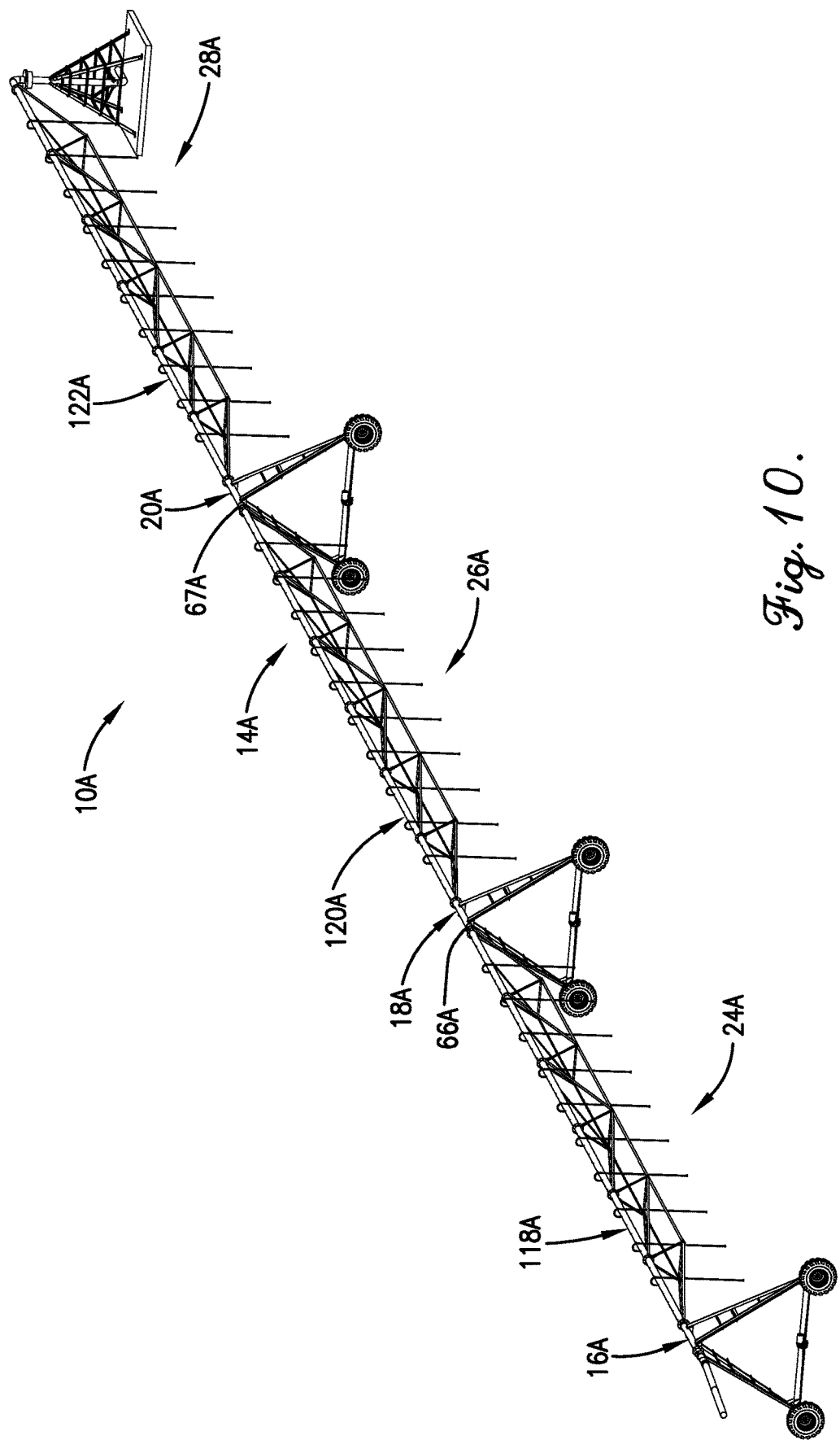
FIG. 10 is a perspective view of an irrigation system constructed in accordance with another embodiment of the present invention.

An irrigation system 10A constructed in accordance with another embodiment of the invention is shown in FIG. 10. The irrigation system 10A may comprise substantially similar components as irrigation system 10; thus, the components of irrigation system 10A that correspond to similar components in irrigation system 10 have an 'A' appended to their reference numerals.

The irrigation system 10A includes all the features of irrigation system 10, except that the truss sections 24A, 26A, 28A comprise Pratt trusses that support a plurality of pipeline spans 118A, 120A, 122A of the conduit 14A extending between the towers 16A, 18A, 20A. The pipeline spans 118A, 120A, 122A may be connected to one another via the joints 66A, 67A. The pipeline spans 118A, 120A, 122A may all be coaxial to one another along the central axis when the pipeline spans 118A, 120A, 122A are aligned.

Figure 11:
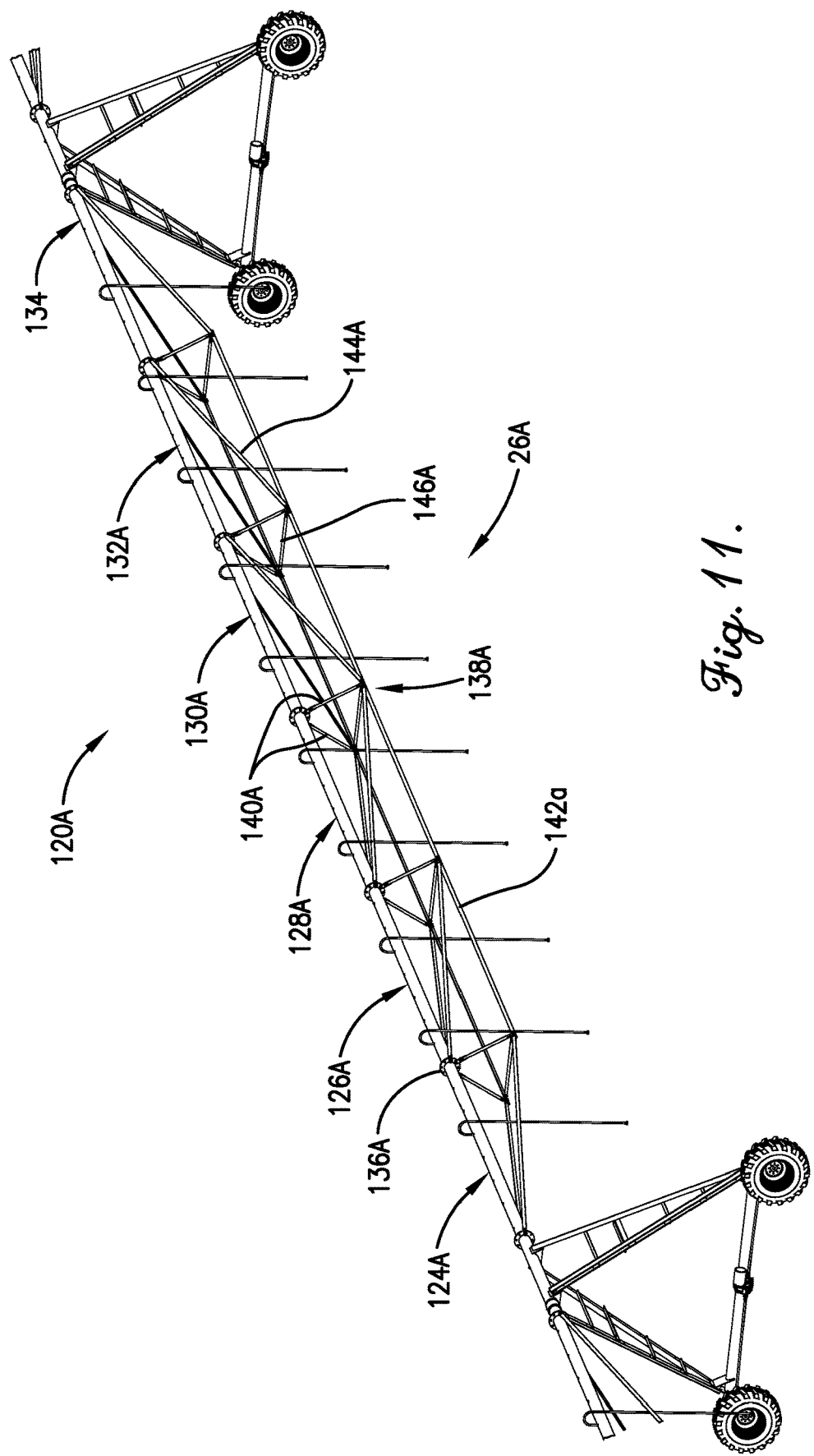
FIG. 11 is a perspective view of an exemplary pipeline span of the irrigation system of FIG. 10.
Figure 12:
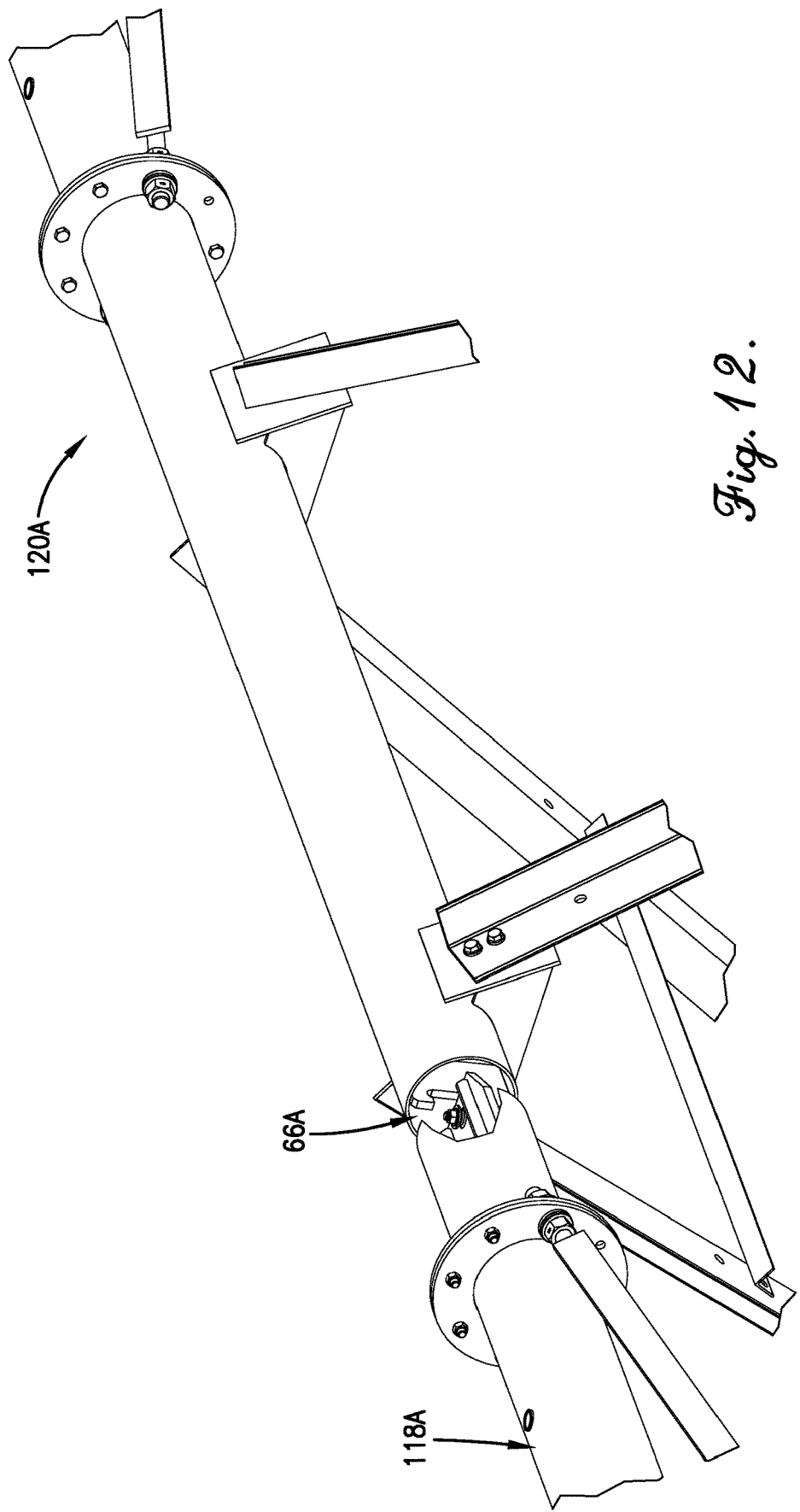
FIG. 12 is a partial view of a joint of the pipeline span of FIG. 11.

Turning to FIG. 11, one of the pipeline spans 118A, 120A, 122A is depicted as a representative pipeline span 120A, and the other pipeline spans 118A, 122A may comprise substantially similar components, including being attached to adjacent spans 118A via a joint 66A (as depicted in FIG. 12). The pipeline span 120A may comprise a plurality of connected pipe sections 124A, 126A, 128A, 130A, 132A, 134A connected end-to-end via flanges 136A.

Figure 13:
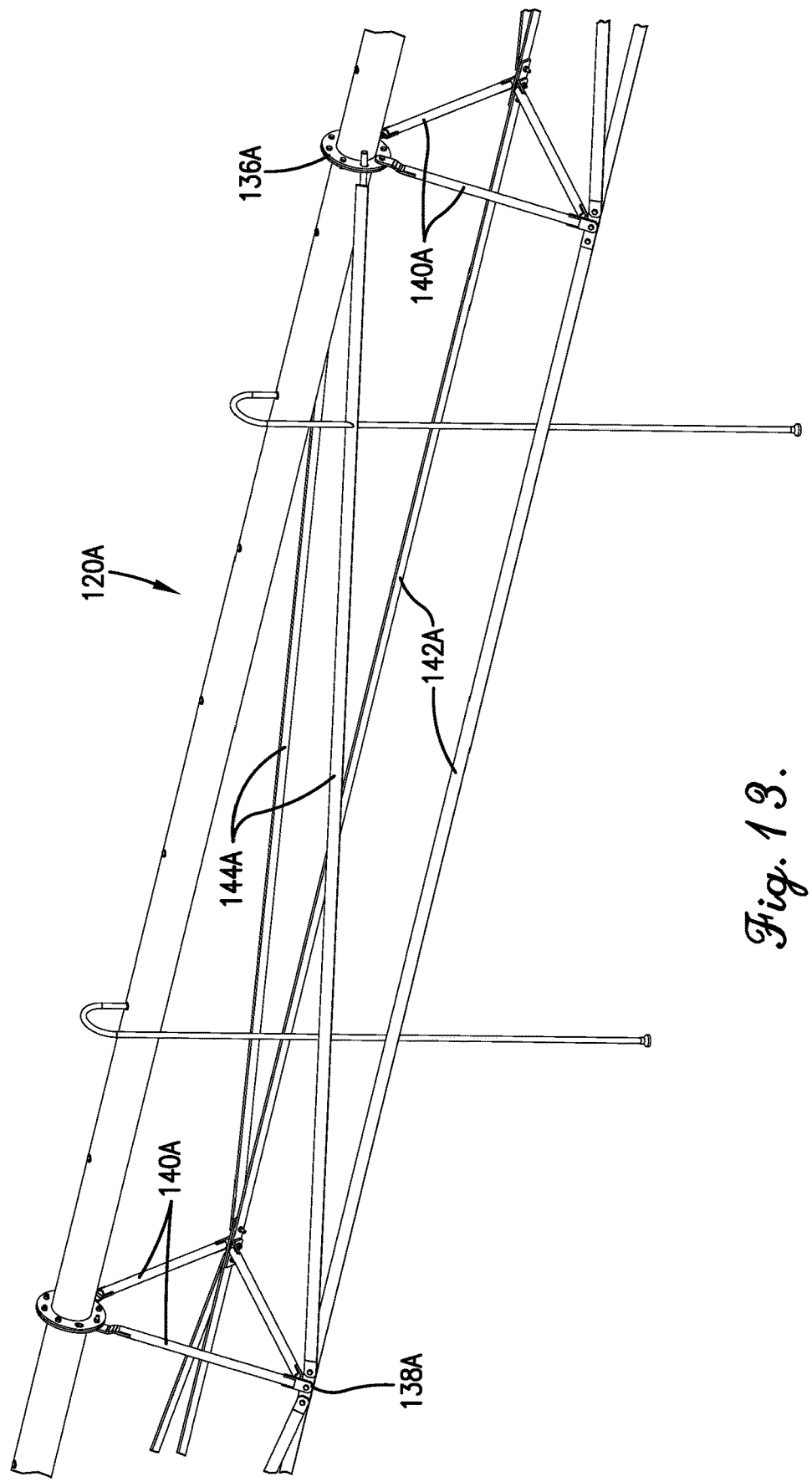
FIG. 13 is a partial view of a middle region of the pipeline span of FIG. 11.
Figure 15:
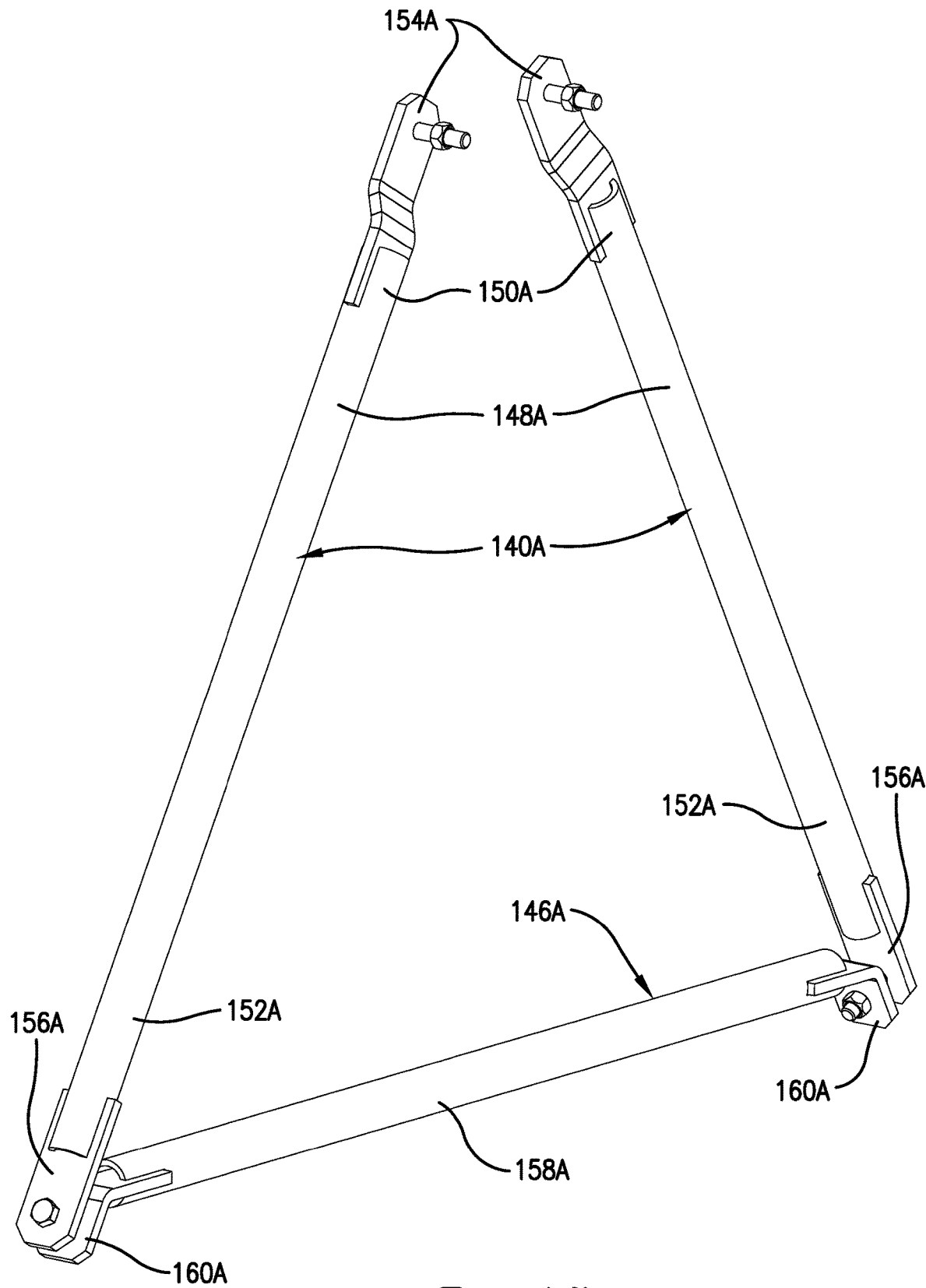
FIG. 15 is a perspective view of exemplary truss section components of the pipeline span of FIG. 11.

The truss section 26A is depicted as a representative truss sections 26A, and the other truss sections 24A, 28A may comprise substantially similar components. The truss section 26A supports the pipeline span 120A and includes elements extending diagonally downward toward a center 138A of the truss section 26A and/or the pipeline span 120A. Particularly, the truss section 26A may comprise compression elements 140A, truss structures 142A, tension elements 144A, and cross tie structures 146A. The compression elements 140A extend downward from the pipeline span 120A and are axially spaced along the pipeline span 120A. In some embodiments, the compression elements 140A comprise axially spaced pairs of brace structures extending from the flanges 136A of the pipe sections 124A, 126A, 128A, 130A, 132A, 134A. Turning briefly to FIG. 15, in some embodiments, the compression elements 140A comprise metal tubular structures 148A with ends 150A, 152A that are crimped and/or welded tabs 154A, 156A. In some embodiments, the compression elements 140A comprise at least one of composite material, angle irons, c-channel structures, square tubing, or the like. Turning to FIG. 13, the compression elements 140A may be secured to the truss structures 142A.

Figure 14:
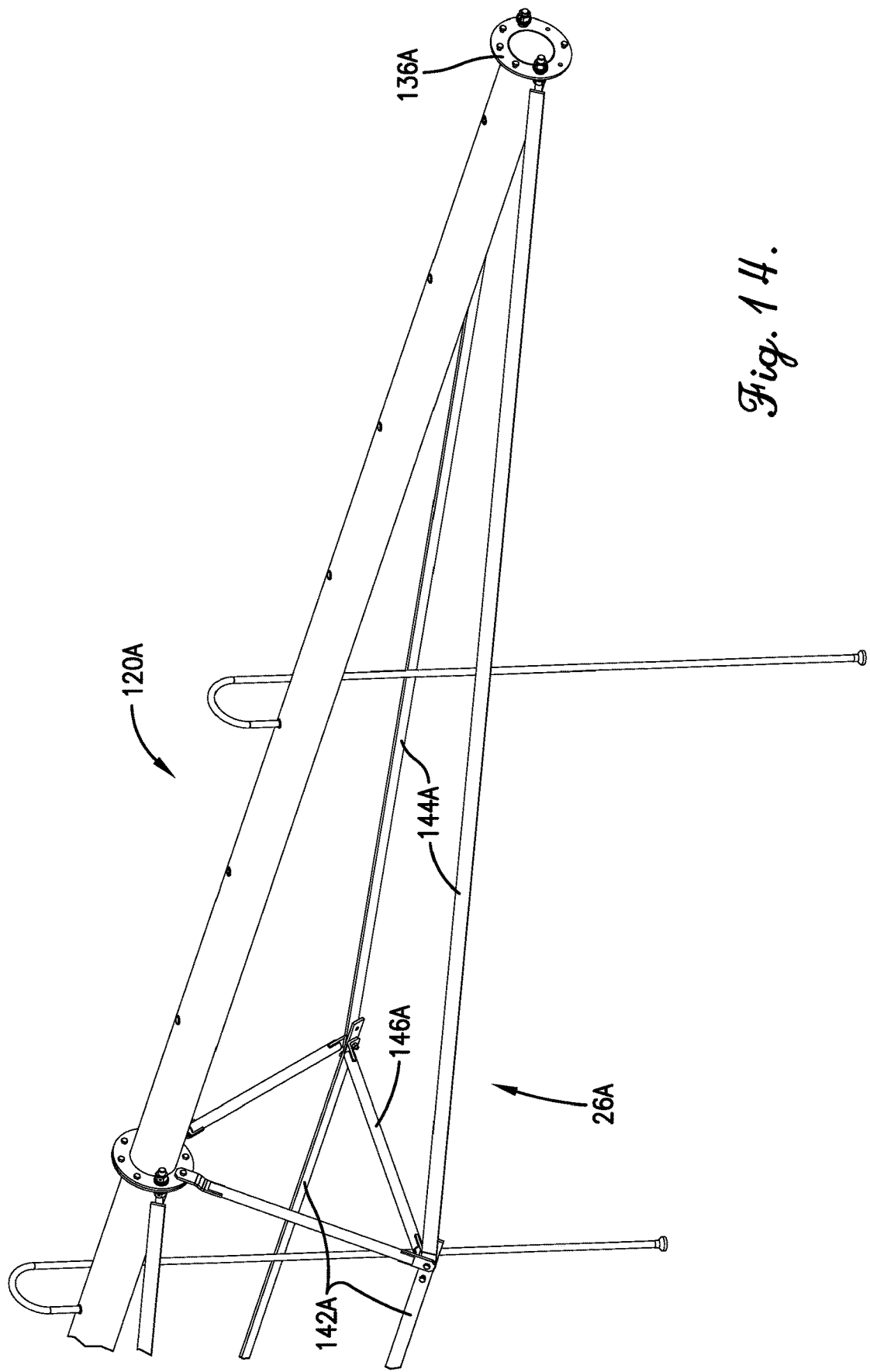
FIG. 14 is a partial view of an end of the pipeline span of FIG. 11.

The truss structures 142A extend longitudinally along the pipeline span 120A and may be fixed relative to the compression elements 140A. The truss structures 142A may comprise cables, metal straps, or the like. The tension elements 144A extend diagonally downward from the pipeline span 120A toward the middle region 138A of the pipeline span 120A. The tension elements 144A may be fixed relative to the truss structures 142A and connected to the flanges 136A. Similar to the truss structures 142A, the tension elements 144A may comprise cables, metal straps, or the like. Turning to FIG. 14, the truss section 26A may terminate on both ends of the pipeline span 120A with tension elements 144A connected to flanges 136A.

The cross tie structures 146A extend transverse relative to the pipeline span 120A between the truss structures 142A. The cross tie structures 146A may be configured so that they are under compression during operation of the irrigation system 10A. Turning to FIG. 15, in some embodiments, the cross tie structures 146A comprise metal tubular structures 158A with ends that are crimped and/or welded tabs 160A. The tabs 160A of the cross tie structures 146A and the tabs 156A of the compression elements 140A may sandwich the truss structures 142A and be fastened to one another. The cross tie structures 146A may comprise at least one of composite material, angle irons, c-channel structures, square tubing, or the like.

Figure 16:
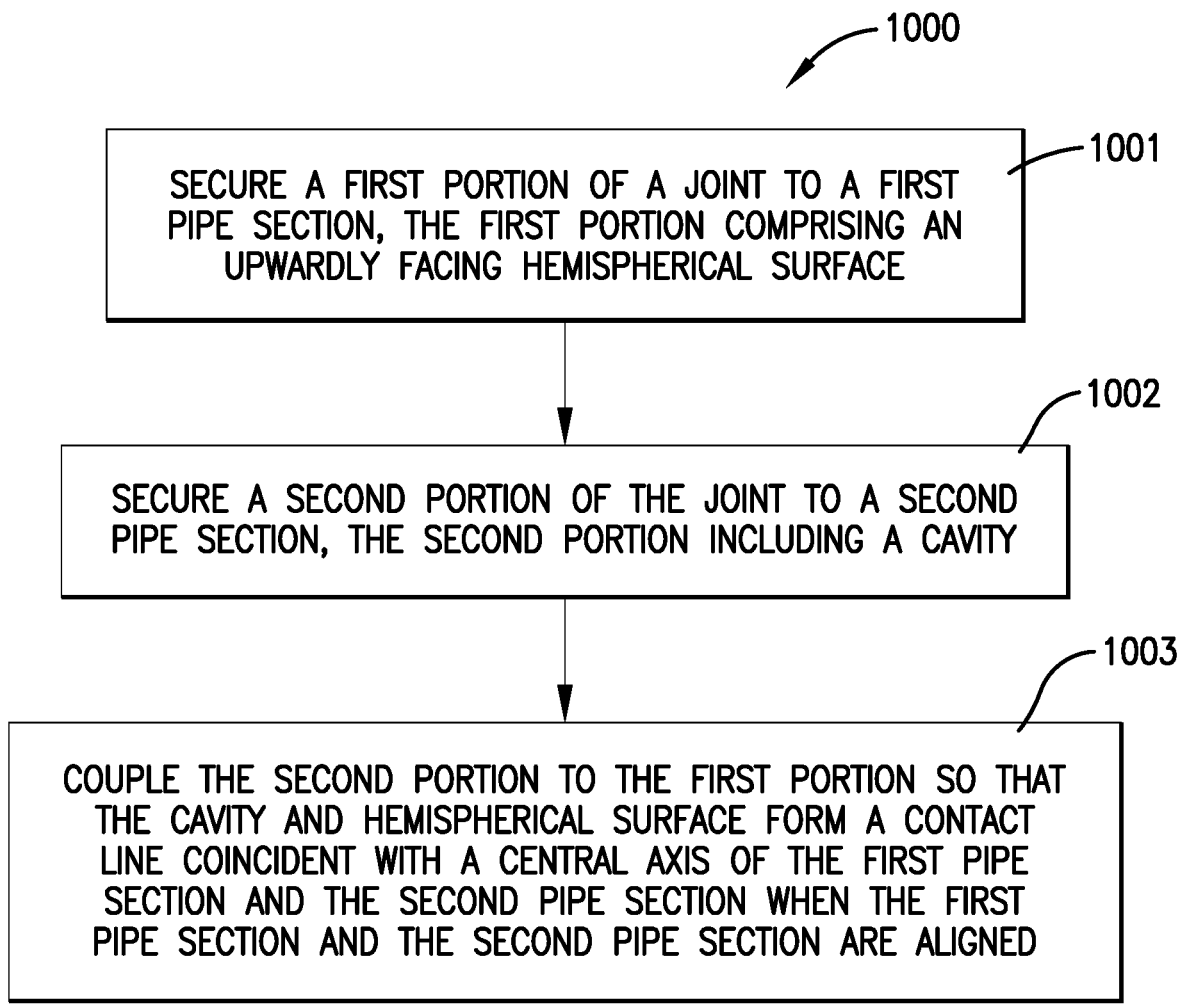
FIG. 16 is a flowchart depicting exemplary steps of a method according to an embodiment of the present invention.

The flow chart of FIG. 16 depicts the steps of an exemplary method 1000 of coupling adjacent pipe sections of an irrigation system. In some alternative implementations, the functions noted in the various blocks may occur out of the order depicted in FIG. 16. For example, two blocks shown in succession in FIG. 16 may in fact be executed substantially concurrently, or the blocks may sometimes be executed in the reverse order depending upon the functionality involved. In addition, some steps may be optional.

Referring to step 1001, the first portion of the joint is secured to the first pipe section. The first portion may be secured to the inner surface of the first pipe section via welding. This step may include securing the plate to the inner surface of the first pipe section and securing the upwardly extending pin to the plate. The first portion may be secured to the first pipe section so that the upwardly facing hemispherical surface intersects the central axis of the first pipe section. The hole of the pin may be formed therein and extend through the length of the pin and the hemispherical surface. The slot of the plate may be formed therein for allowing the second portion to freely rotate on the hemispherical surface of the first portion.

Referring to step 1002, the second portion of the joint may be secured to the second pipe section. The horizontal plate may be secured to the inner surface of the second pipe section with the frustoconical countersink facing downwards. This step may include securing the stiffeners to the plate.

Referring to step 1003, the second portion is coupled to the first portion so that the cavity and hemispherical surface form a contact line coincident with a central axis of the first pipe section and the second pipe section when the first pipe section and the second pipe section are aligned. This step may include inserting the fastener through the hemispherical surface and the cavity and securing the capture ring to the fastener so that the capture ring maintains the second portion in engagement with first portion.

The method 1000 may include additional, less, or alternate steps and/or device(s), including those discussed elsewhere herein. For example, the method may include attaching the sleeve to the first pipe section and the section pipe section to provide a sealed fluid connection between the first pipe section and the second pipe section.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim (s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An irrigation system comprising:
    two support towers;
    a first pipeline span extending between the two support towers along a central axis and having a middle region;
    a second pipeline span adjacent to the first pipeline span and coaxial with the first pipeline span when the first pipeline span and the second pipeline span are aligned;
    a joint pivotally connecting the first pipeline span to the second pipeline span and comprising—
        a sleeve configured to provide a sealed fluid connection between the first pipeline span and the second pipeline span,
        a first portion secured to the first pipeline span and having an upwardly facing hemispherical surface, and
        a second portion secured to the second pipeline span and having a cavity that receives at least a portion of the hemispherical surface of the first portion to form a contact line coincident with the central axis when the first pipeline span and the second pipeline span are aligned; and
    a truss section supporting the first pipeline span and comprising—
        compression elements extending downward from the first pipeline span,
        truss structures extending longitudinally along the first pipeline span and fixed relative to the compression elements, and
        tension elements extending diagonally downward from the first pipeline span toward the middle region of the first pipeline span and fixed relative to the truss structures.

2. The irrigation system of claim 1, wherein the compression elements are axially spaced along the first pipeline span and comprise pairs of axially spaced brace structures.

3. The irrigation system of claim 1, further comprising cross tie structures extending transverse relative to the first pipeline span between the truss structures.

4. The irrigation system of claim 3, wherein the cross tie structures are under compression.

5. The irrigation system of claim 3, wherein the compression elements and the cross tie structures comprise metal tubular structures.

6. The irrigation system of claim 5, wherein the metal tubular structures include ends that are at least one of crimped ends or welded tabs.

7. The irrigation system of claim 3, wherein the compression elements and the cross tie structures comprise at least one of composite material, angle irons, c-channel structures, or square tubing.

8. The irrigation system of claim 3, wherein the compression elements, the cross tie structures, and the tension elements are secured to the truss structures.

9. The irrigation system of claim 1, wherein the truss structures and the tension elements comprise at least one of cables or metal straps.

10. The irrigation system of claim 1, wherein at least one of the two support towers is a mobile support tower configured to move across a field.

11. An irrigation system comprising:
a plurality of mobile support towers configured to move across a field;
a plurality of pipeline spans supported above the field by the support towers and extending along a central axis when aligned, each of the plurality of pipeline spans including a middle region;
a plurality of joints pivotally connecting the plurality of pipeline spans, each of the plurality of joints comprising—
a sleeve configured to provide a sealed fluid connection between two pipeline spans of the plurality of pipeline spans,
a first portion secured to one of the two pipeline spans and having an upwardly facing hemispherical surface, and
a second portion secured to the other of the two pipeline spans and having a cavity that receives at least a portion of the hemispherical surface of the first portion to form a contact line coincident with the central axis when the two pipeline spans are aligned; and
a plurality of truss sections supporting the plurality of pipeline spans, each of the plurality of truss sections comprising—
compression elements extending downward from a respective pipeline span of the plurality of pipeline spans,
truss structures extending longitudinally along the respective pipeline span and fixed relative to the compression elements, and
tension elements extending diagonally downward from the respective pipeline span toward the middle region of the respective pipeline span and fixed relative to the truss structures.

12. The irrigation system of claim 11, wherein the compression elements are axially spaced along the respective pipeline span and comprise pairs of laterally spaced brace structures.

13. The irrigation system of claim 12, further comprising cross tie structures extending transverse relative to the respective pipeline span between the pairs of brace structures.

14. The irrigation system of claim 13, wherein the cross tie structures are under compression.

15. An irrigation system comprising:
two support towers;
a first pipeline span extending between the two support towers along a central axis;
a second pipeline span adjacent to the first pipeline span and coaxial with the first pipeline span when the first pipeline span and the second pipeline span are aligned;
a joint pivotally connecting the first pipeline span to the second pipeline span and comprising—
a sleeve configured to provide a sealed fluid connection between the first pipeline span and the second pipeline span,
a first portion secured to the first pipeline span and having an upwardly facing hemispherical surface, and
a second portion secured to the second pipeline span and having a cavity that receives at least a portion of the hemispherical surface of the first portion to form a contact line coincident with the central axis when the first pipeline span and the second pipeline span are aligned; and
a truss section supporting the first pipeline span and comprising—
pairs of tubular brace structures axially spaced along the first pipeline span and extending downward from the first pipeline span,
truss straps extending longitudinally along the first pipeline span between the pairs of tubular brace structures,
tubular cross tie structures extending laterally relative to the first pipeline span between the pairs of tubular brace structures, and
pipe straps extending from the first pipeline span diagonally downward to the tubular brace structures in a direction toward a mid-point between the two support towers.

16. The irrigation system of claim 15, further comprising a plurality of flanges axially spaced along the first pipeline span, wherein the pairs of tubular brace structures at connected to the plurality of flanges.

17. The irrigation system of claim 16, wherein the truss straps are connected to the plurality of flanges.

18. The irrigation system of claim 16, wherein the flanges are attached to the first pipeline span.

19. The irrigation system of claim 15, wherein the truss section is a first truss section, further comprising a second truss section supporting the second pipeline span and comprising—
pairs of tubular brace structures axially spaced along the second pipeline span and extending downward from the second pipeline span,
truss straps extending longitudinally along the second pipeline span between the pairs of tubular brace structures,
tubular cross tie structures extending laterally relative to the second pipeline span between the pairs of tubular brace structures, and
pipe straps extending from the first pipeline span diagonally downward to the brace structures in a direction toward a mid-point of the second pipeline span.

20. The irrigation system of claim 15, wherein the first pipeline span comprises a plurality of connected pipe sections.

* * * * *